United States Patent
Yang (10) Patent No.: US 11,074,897 B2
(45) Date of Patent: Jul. 27, 2021

(54) METHOD AND APPARATUS FOR TRAINING ADAPTATION QUALITY EVALUATION MODEL, AND METHOD AND APPARATUS FOR EVALUATING ADAPTATION QUALITY

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/083,740

(22) Filed: Oct. 29, 2020

(65) Prior Publication Data

US 2021/0043173 A1 Feb. 11, 2021

Related U.S. Application Data (63) Continuation of application No. PCT/CN2019/083092, filed on Apr. 17, 2019.

(30) Foreign Application Priority Data

Jul. 18, 2018 (CN) .......................... 201810793081.3

(51) Int. Cl.
G10H 1/00 (2006.01)
(52) U.S. Cl.
CPC ..... G10H 1/0008 (2013.01); *G10H 2210/091* (2013.01)
(58) Field of Classification Search
CPC .................. G10H 1/0008; G10H 2210/091
(Continued)

(56) References Cited

U.S. PATENT DOCUMENTS 7,723,602 B2 * 5/2010 Beckford ............. G10H 1/0008
84/609
8,924,270 B2 * 12/2014 Tran ................... G06Q 30/0272
705/35

(Continued)

FOREIGN PATENT DOCUMENTS

| CN | 2271006 | 12/1997 |
| CN | 201294089 | 8/2009 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jianchun Qin
(74) *Attorney, Agent, or Firm* — Fish & Richardson P.C.

(57) ABSTRACT

Disclosed herein are methods, systems, and apparatus, including computer programs encoded on computer storage media, for training a musical work adaptation quality evaluation model. One of the methods includes: obtaining a plurality of adapted musical work samples; separating audio tracks of each of the plurality of adapted musical work samples; determining instrument information identifying instruments played in each of the audio tracks; performing originality analysis on each of the audio tracks to obtain an originality value corresponding to each audio track; for each of the audio tracks, using a combination of the instrument information and the originality value corresponding to the particular audio track of the adapted musical work samples as a sample feature; and training a musical work adaptation quality evaluation model by using sample features of corresponding adapted musical work samples as input, and a (Continued)

predetermined evaluation score of the corresponding adapted musical work sample as output.

24 Claims, 4 Drawing Sheets

(58) Field of Classification Search
USPC .................................................. 84/477 R
See application file for complete search history.

(56) References Cited

U.S. PATENT DOCUMENTS

| | | | |
|---|---|---|---|
| 9,654,447 B2* | 5/2017 | Brock | H04L 63/0263 |
| 2008/0178302 A1* | 7/2008 | Brock | G06F 16/951 726/32 |
| 2011/0011243 A1 | 1/2011 | Homburg | |
| 2011/0112994 A1 | 5/2011 | Goto et al. | |
| 2015/0317911 A1 | 11/2015 | Kawabata | |
| 2017/0134162 A1* | 5/2017 | Code | G06F 21/10 |
| 2018/0041571 A1* | 2/2018 | Rogers | H04L 67/22 |

FOREIGN PATENT DOCUMENTS

| | | |
|---|---|---|
| CN | 104680335 | 6/2015 |
| CN | 105590633 | 5/2016 |
| CN | 106652655 | 5/2017 |
| CN | 106682695 | 5/2017 |
| CN | 107845408 | 3/2018 |
| CN | 109190879 | 1/2019 |
| GB | 2533654 | 6/2016 |
| TW | 316961 | 10/1997 |
| TW | 201109944 | 3/2011 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/083092, dated Jul. 23, 2019, 10 pages (with partial English translation).
PCT International Preliminary Report on Patentability in International Application No. PCT/CN2019/083092, dated Jan. 19, 2021, 9 pages (with English translation).
Extended European Search Report in European Application No. 19838690.6, dated Mar. 25, 2021, 9 pages.

* cited by examiner

METHOD AND APPARATUS FOR TRAINING ADAPTATION QUALITY EVALUATION MODEL, AND METHOD AND APPARATUS FOR EVALUATING ADAPTATION QUALITY

CROSS-REFERENCE TO RELATED APPLICATIONS

This application is a continuation of PCT Application No. PCT/CN2019/083092, filed on Apr. 17, 2019, which claims priority to Chinese Patent Application No. 201810793081.3, filed on Jul. 18, 2018, and each application is hereby incorporated by reference in its entirety.

TECHNICAL FIELD

Embodiments of the present specification relate to the field of information technologies, and in particular, to methods and apparatuses for training an adaptation quality evaluation model, and methods and apparatuses for evaluating adaptation quality.

BACKGROUND

Musical adaptation means adapting melodies based on existing musical works to obtain adapted musical works.

With the prosperity of the online music market, a large quantity of adapted musical works are uploaded to the Internet. In some service scenarios, adaptation quality of the adapted musical works need to be evaluated. For example, the copyright service platform needs to evaluate adaptation quality of an adapted musical work uploaded by a user, so as to determine how much reward should be awarded to the user based on an evaluation result.

Currently, adaptation quality of an adapted musical work is mainly evaluated manually, and it is difficult to efficiently process a large quantity of adapted musical works.

SUMMARY

To alleviate a problem that an existing method for evaluating adaptation quality of an adapted musical work has relatively low efficiency, embodiments of the present specification provide methods and apparatuses for training an adaptation quality evaluation model, and methods and apparatuses for evaluating adaptation quality. Technical solutions are as follows:

According to a first aspect of the embodiments of the present specification, a method for training an adaptation quality evaluation model is provided, including: obtaining an adapted musical work sample set; separating audio tracks of each adapted musical work sample in the adapted musical work set, and determining instrument information corresponding to each audio track of the adapted musical work sample; performing musical originality analysis on each audio track of the adapted musical work sample to obtain a musical originality representation value corresponding to each audio track of the adapted musical work sample; using a combination of the instrument information and the musical originality representation value corresponding to each audio track of the adapted musical work sample as a sample feature of the adapted musical work sample; and performing model training by using each sample feature of the adapted musical work sample as model input, and using an adaptation quality score corresponding to the adapted musical work sample as model output, to obtain an adaptation quality evaluation model.

According to a second aspect of the embodiments of the present specification, a method for evaluating adaptation quality is provided, including: obtaining an adapted musical work; separating audio tracks of the adapted musical work, and determining instrument information corresponding to each audio track of the adapted musical work; and performing musical originality analysis on each audio track of the adapted musical work to obtain a musical originality representation value corresponding to each audio track of the adapted musical work; using a combination of the instrument information and the musical originality representation value corresponding to each audio track of the adapted musical work as a feature of the adapted musical work; and inputting each feature of the adapted musical work to an adaptation quality evaluation model to obtain an adaptation quality score that corresponds to the adapted musical work and that is output by the adaptation quality evaluation model.

The adaptation quality evaluation model is obtained based on the above-mentioned method for training an adaptation quality evaluation model.

According to a third aspect of the embodiments of the present specification, an apparatus for training an adaptation quality evaluation model is provided, including: an obtaining module, configured to obtain an adapted musical work sample set; an audio track separation module, configured to separate audio tracks of each adapted musical work sample in the adapted musical work set, and determine instrument information corresponding to each audio track of the adapted musical work sample; an originality analysis module, configured to perform musical originality analysis on each audio track of the adapted musical work sample to obtain a musical originality representation value corresponding to each audio track of the adapted musical work sample; a determining module, configured to use a combination of the instrument information and the musical originality representation value corresponding to each audio track of the adapted musical work sample as a sample feature of the adapted musical work sample; and a training module, configured to perform model training by using each sample feature of the adapted musical work sample as model input, and using an adaptation quality score corresponding to the adapted musical work sample as model output, to obtain an adaptation quality evaluation model.

According to a fourth aspect of the embodiments of the present specification, an apparatus for evaluating adaptation quality is provided, including: an obtaining module, configured to obtain an adapted musical work; an audio track separation module, configured to separate audio tracks of the adapted musical work, and determine instrument information corresponding to each audio track of the adapted musical work; and an originality analysis module, configured to perform musical originality analysis on each audio track of the adapted musical work to obtain a musical originality representation value corresponding to each audio track of the adapted musical work; a determining module, configured to use a combination of the instrument information and the musical originality representation value corresponding to each audio track of the adapted musical work as a feature of the adapted musical work; and an evaluation module, configured to input each feature of the adapted musical work to an adaptation quality evaluation model to obtain an adaptation quality score that corresponds to the adapted musical work and that is output by the adaptation quality evaluation model.

The adaptation quality evaluation model is obtained based on the above-mentioned method for training an adaptation quality evaluation model.

In the technical solutions provided in the embodiments of the present specification, an adaptation quality evaluation model is trained by using a machine learning method based on sample features of a plurality of adapted musical work samples whose adaptation quality scores are known, and is used to evaluate a to-be-evaluated adapted musical work. The sample feature of the adapted musical work sample includes at least a combination of instrument information and a musical originality representation value corresponding to each audio track of the adapted musical work sample. In the embodiments of the present specification, adaptation quality of a large quantity of adapted musical works can be efficiently evaluated by using the trained adaptation quality evaluation model.

It should be understood that the previous general description and the following detailed description are merely illustrative examples, and cannot limit the embodiments of the present specification.

In addition, any of the embodiments in the present specification does not need to achieve all of the previous effects.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description merely show some of the embodiments of the present specification, and a person of ordinary skill in the art can still derive other drawings from these accompanying drawings.

DESCRIPTION OF EMBODIMENTS

To make a person skilled in the art understand the technical solutions in the embodiments of the present specification better, the following described in detail the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification shall fall within the protection scope.

The technical solutions provided in the embodiments of the present specification are described in detail below with reference to the accompanying drawings.

Figure 1:
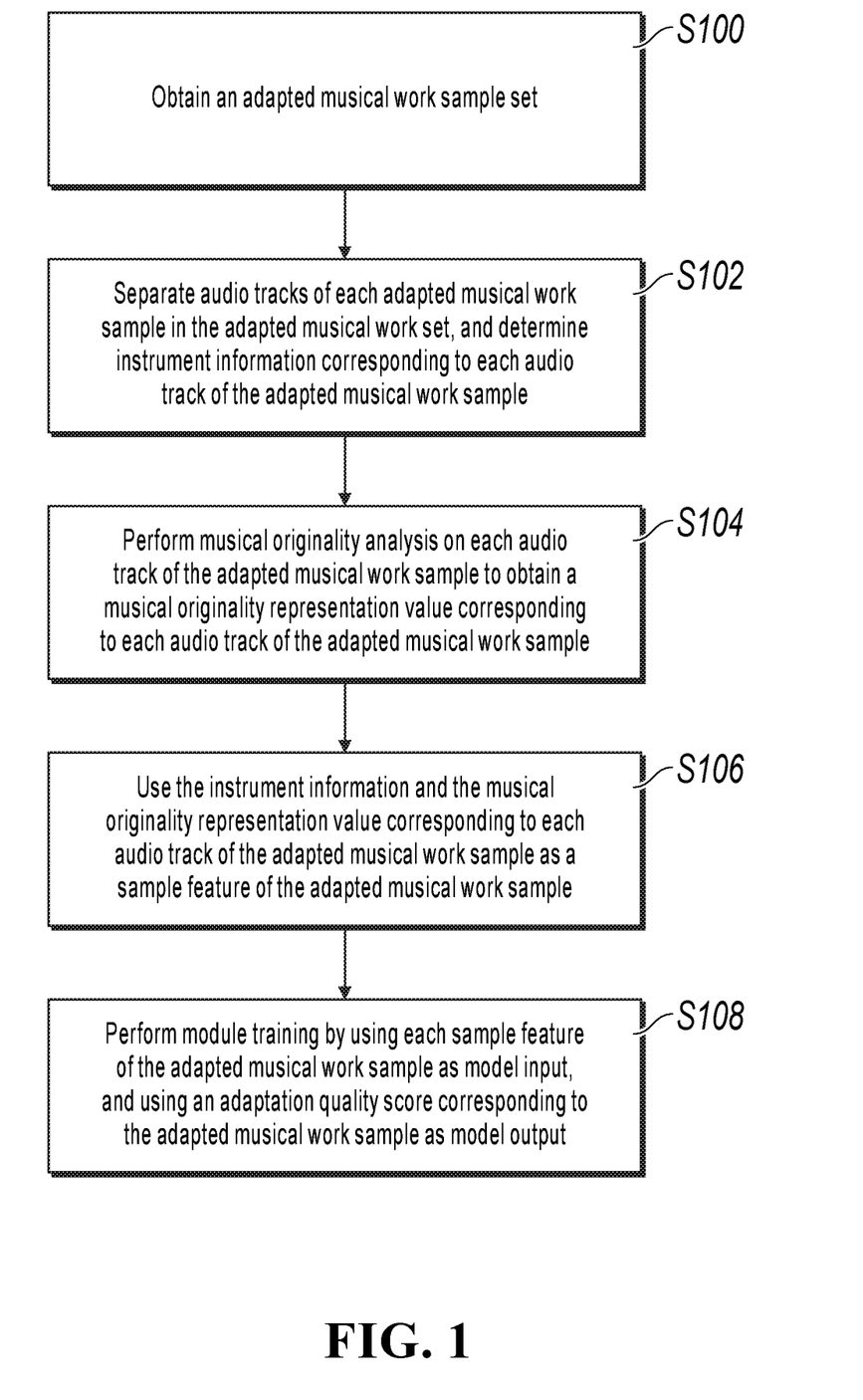
FIG. 1 is a schematic flowchart illustrating a method for training an adaptation quality evaluation model, according to an embodiment of the present specification.

FIG. 1 is a schematic flowchart illustrating a method for training an adaptation quality evaluation model, according to an embodiment of the present specification. The method includes the following steps.

S100. Obtain an adapted musical work sample set.

The method can be executed by a device having a data processing function, such as a server, a computer, or a mobile phone.

In some embodiments of the present specification, to make an adaptation quality evaluation model obtained through training relatively accurate, a large quantity of adapted musical works usually need to be obtained as samples to form the adapted musical work sample set.

It should be noted that an adapted musical work is usually a musical composition file in a digital format, such as a composition file in a musical instrument digital interface (MIDI) format.

S102: Separate audio tracks of each adapted musical work sample in the adapted musical work set, and determine instrument information corresponding to each audio track of the adapted musical work sample.

S104: Perform musical originality analysis on each audio track of the adapted musical work sample to obtain a musical originality representation value corresponding to each audio track of the adapted musical work sample.

S106: Use a combination of the instrument information and the musical originality representation value corresponding to each audio track of the adapted musical work sample as a sample feature of the adapted musical work sample.

As is known to all, in the model training field, a feature can be extracted from a sample, and model training is performed on each sample by using a supervised learning algorithm based on a sample feature of the sample and a label of the sample. A model training process is actually a process that a machine determines a mapping relationship between a sample feature and a label of a sample. Therefore, after model training is performed, a feature of a to-be-verified target object can be input to the model, and the model outputs a label of the target object.

In this embodiment of the present specification, steps S102 to S106 can be performed to obtain a sample feature of each adapted musical work sample in the adapted musical work set.

Generally, for a composition file, a melody corresponding to each audio track is performed by one or more instruments, and not all of the audio tracks correspond to the same instrument. In this embodiment of the present specification, for each adapted musical work sample in the adapted musical work set, if the adapted musical work sample is a composition file in the MIDI format, a melody of the composition file in the MIDI format is obtained by separately compiling audio tracks, and the adapted musical work sample also includes instrument information corresponding to each audio track. Therefore, it is easy to separate the audio tracks of the adapted musical work sample and obtain the instrument information corresponding to each audio track of the adapted musical work sample. It should be noted that the instrument information is usually a predetermined instrument number, for example, an instrument number of a guitar is 1, and an instrument number of Bass is 5. The instrument information can also be another string that can uniquely identify an instrument.

In addition, if the adapted musical work sample is a composition file in another digital format than the MIDI format, a common audio track separation technology can be used to separate the audio tracks of the adapted musical work sample, and an instrument corresponding to each audio track of the adapted musical work sample is determined through analysis based on different timbres of various instruments. It is worthwhile to note that in this case, an instrument number can be allocated to each type of instrument in advance. As such, the instrument corresponding to each audio track of the adapted musical work sample is analyzed, and therefore the instrument information corresponding to each audio track of the adapted musical work sample is determined.

In this embodiment of the present specification, musical originality analysis is to compare a target melody with a reference melody in a melody library to determine a reference melody most similar to the target melody from an existing melody library by using a digital analysis method as a key reference melody, and obtain a degree of similarity between the target melody and the key reference melody. This is a technical method well known to a person skilled in the art.

The similarity degree is usually a value between 0 to 100%, representing a degree of similarity between the target melody and the key reference melody. For example, if the similarity degree is 20%, it indicates that 20% of the target melody is similar to the key reference melody. Clearly, a higher similarity degree indicates a lower original degree of the target melody.

In this embodiment of the present specification, each audio track of each adapted musical work sample in the adapted musical work sample set corresponds to a piece of melody, and therefore musical originality analysis needs to be performed on each audio track of the adapted musical work sample to obtain a musical originality representation value corresponding to each audio track of the adapted musical work sample. The musical originality representation value corresponding to any audio track can be a degree of similarity between a melody corresponding to the audio track and the key reference melody in the melody library. In this case, a larger musical originality representation value indicates a lower original degree of a melody corresponding to the audio track. The musical originality representation value corresponding to the audio track can also be (1—similarity degree). In this case, a larger musical originality representation value indicates a greater original degree of the melody corresponding to the audio track.

In addition, the musical originality representation value corresponding to the audio track can also be obtained by performing other processing on the similarity degree. In conclusion, the musical originality representation value corresponding to the audio track can represent the original degree of the melody corresponding to the audio track.

In this embodiment of the present specification, any adapted musical work sample in the adapted musical work set is used as an example for description. A combination of the instrument information and the musical originality representation value corresponding to each audio track of the adapted musical work sample is used as a sample feature of the adapted musical work sample.

For example, for an adapted musical work sample, audio tracks of the adapted musical work sample are separated to obtain three audio tracks A, B, and C, and it is further determined that a number corresponding to track A is 1 (guitar), a number corresponding to track B is 5 (Bass), and a number corresponding to track C is 3 (drum set). In addition, musical originality analysis is performed on each audio track of the adapted musical work sample to determine that a musical originality representation value corresponding to track A is 70, a musical originality representation value corresponding to track B is 50, and a musical originality representation value corresponding to track C is 30. Therefore, based on step S106, the three instrument numbers (1, 70), (5, 50), and (3, 30) can be combined with the musical originality representation values, and the combinations are used as three sample features of the adapted musical work sample.

S108: Perform model training by using each sample feature of the adapted musical work sample as model input, and using an adaptation quality score corresponding to the adapted musical work sample as model output, to obtain an adaptation quality evaluation model.

For each adapted musical work sample in the adapted musical work set, after the sample feature of the adapted musical work sample is obtained, a label of the adapted musical work sample, namely, an adaptation quality score corresponding to the adapted musical work sample further needs to be obtained. Usually, the adaptation quality score corresponding to the adapted musical work sample is manually specified. Specifically, adaptation quality of the adapted musical work sample can be evaluated by several music experts based on subjective experience, an adaptation quality score of the adapted musical work sample is given.

After the sample feature and the adaptation quality score of each adapted musical work sample in the adapted musical work set are obtained, model training can be performed by using each sample feature of each adapted musical work sample as model input, and using the adaptation quality score corresponding to the adapted musical work sample as model output. Finally, the adaptation quality evaluation model is obtained.

In addition, any adapted musical work sample in the adapted musical work sample set is used as an example. In step S102, there could be following cases for an audio track of the adapted musical work sample:

Case 1: An instrument corresponding to the audio track cannot be identified.

Case 2: An instrument corresponding to the audio track possibly be a relatively rare instrument.

For case 1 and case 2, a specified number can be predetermined as an unknown instrument number, and is used to uniformly identify an instrument that cannot be identified and a rare instrument. As such, the instrument information corresponding to the audio track is sometimes a predetermined instrument number, and sometimes is a specified number.

For example, the specified number can be 99. For track A of the adapted musical work sample, when an instrument corresponding to track A cannot be analyzed, the number corresponding to track A is determined as 99. For track B of the adapted musical work sample, when an instrument corresponding to track B obtained through analysis is relatively rare and is not in predetermined several instruments, the number corresponding to track B is also determined as 99. For track C of the adapted musical work sample, an instrument corresponding to track C is a drum set, and the drum set is in several predetermined instruments. Therefore, the number corresponding to track C is determined as a number corresponding to the drum set, for example, the number is 3.

In this embodiment of the present specification, further, the sample feature of the adapted musical work sample can include not only several combinations of the instrument information and the musical originality representation values, but also at least one of the following features:

1. Amount of pre-specified instrument information. Specifically, before model training is performed, it is determined, an amount of pre-specified instrument information in the instrument information corresponding to each adapted musical work sample is determined; and the determined amount is used as a sample feature corresponding to the adapted musical work sample.

2. Coordination representation value corresponding to the adapted musical work sample. Specifically, before model training is performed, coordination analysis is performed on each audio track of each adapted musical work sample to obtain a coordination representation value corresponding to the adapted musical work sample; and the obtained coordination representation value is used as a sample feature corresponding to the adapted musical work sample.

Performing coordination analysis on each audio track is analyzing whether rhythms of melodies corresponding to the audio tracks coordinate with each other in terms of beat, and a degree at which the rhythms of the melodies corresponding to the audio tracks coordinate with each other in terms of beat is represented by the coordination representation value corresponding to the adapted musical work sample.

Any adapted musical work sample in the adapted musical work sample set is used as an example for description. assume that the pre-specified instrument information is 1, 5, and 6. A number corresponding to track A of the adapted musical work sample is 1 (guitar), a number corresponding to track B is 5 (Bass), and a number corresponding to track C is 99 (an unknown instrument). It can be seen that in the instrument information corresponding to the adapted musical work sample, an amount of pre-specified instrument information (that is, numbers 1 and 5) is 2. In addition, it can be determined through musical originality analysis that a musical originality representation value corresponding to track A is 20, a musical originality representation value corresponding to track B is 60, and a musical originality representation value corresponding to track C is 80. It can be determined through coordination analysis that a coordination representation value corresponding to the adapted musical work sample is 59. In this case, the adapted musical work sample has five sample features in total: (1, 20), (5, 60), (99, 80), 2, and 59.

Figure 2:
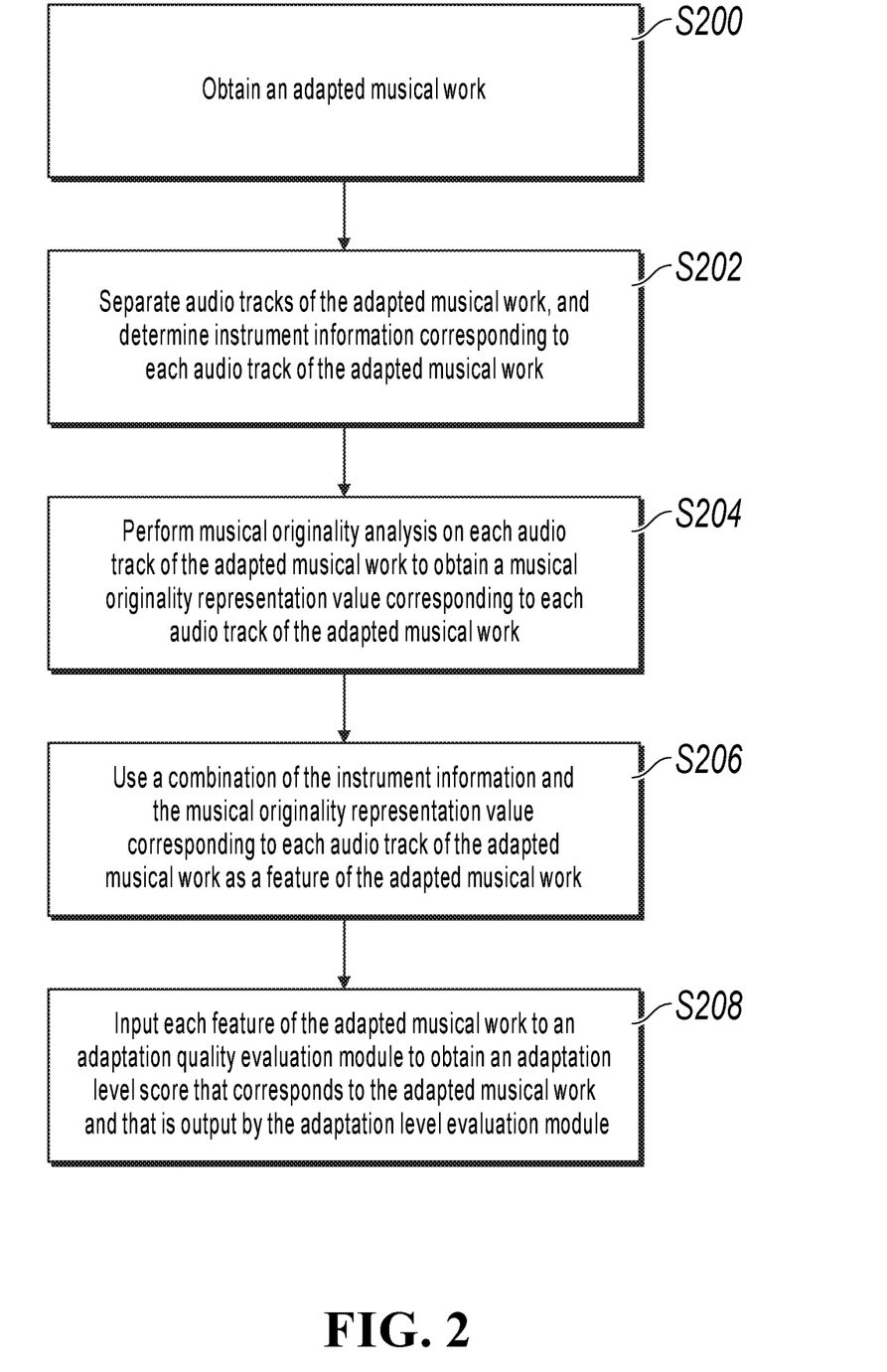
FIG. 2 is a schematic flowchart illustrating a method for evaluating adaptation quality, according to an embodiment of the present specification.

FIG. 2 is a schematic flowchart illustrating a method for evaluating adaptation quality, according to an embodiment of the present specification. The method includes the following steps:

S200: Obtain an adapted musical work.

S202: Separate audio tracks of the adapted musical work, and determine instrument information corresponding to each audio track of the adapted musical work.

S204: Perform musical originality analysis on each audio track of the adapted musical work to obtain a musical originality representation value corresponding to each audio track of the adapted musical work.

S206: Use a combination of the instrument information and the musical originality representation value corresponding to each audio track of the adapted musical work as a feature of the adapted musical work.

S208: Input each feature of the adapted musical work to an adaptation quality evaluation model to obtain an adaptation quality score that corresponds to the adapted musical work and that is output by the adaptation quality evaluation model.

The method for evaluating adaptation quality shown in FIG. 2 is actually a method for evaluating a to-be-evaluated adapted musical work by using the adaptation quality evaluation model obtained by using the method for training an adaptation quality evaluation model shown in FIG. 1.

A feature corresponding to the to-be-evaluated adapted musical work also needs to be obtained, and the feature of the to-be-evaluated adapted musical work is input to the adaptation quality evaluation model. The adaptation quality evaluation model outputs an adaptation quality score corresponding to the adapted musical work. Usually, a higher adaptation quality score indicates a higher adaptation quality.

The instrument information corresponding to each audio track of the adapted musical work is a number corresponding to a known musical instrument or a number corresponding to an unknown musical instrument.

Before each feature of the adapted musical work is input to the adaptation quality evaluation model, an amount of pre-specified instrument information in the instrument information corresponding to the adapted musical work can be determined; and the determined amount is used as a feature corresponding to the adapted musical work.

Before each sample feature of the adapted musical work is input to the adaptation quality evaluation model, coordination analysis can be performed on each audio track of the adapted musical work to obtain a coordination representation value corresponding to the adapted musical work; and the obtained coordination representation value is used as a feature corresponding to the adapted musical work.

It is worthwhile to note that in the method shown in FIG. 2, a specific method for obtaining the feature of the to-be-evaluated adapted musical work is the same as a method for obtaining the sample feature of any adapted musical work sample described in the descriptions of the method shown in FIG. 1.

Adaptation quality of a large quantity of adapted musical works can be efficiently evaluated by using the trained adaptation quality evaluation module and by using the method for training an adaptation quality evaluation module shown in FIG. 1 and the method for evaluating adaptation quality shown in FIG. 2. In addition, model training is performed by using the instrument information and the musical originality representation value corresponding to each audio track of the adapted musical work as the feature, so that evaluation of evaluation quality of the adaptation quality evaluation model for the adapted musical work is relatively accurate.

Figure 3:
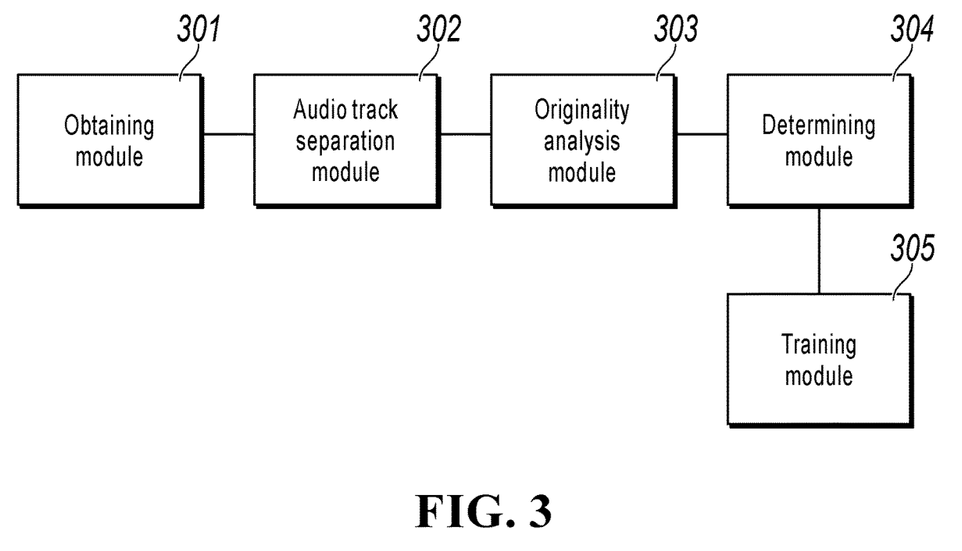
FIG. 3 is a schematic structural diagram illustrating an apparatus for training an adaptation quality evaluation model, according to an embodiment of the present specification.

Based on the method for training an adaptation quality evaluation model shown in FIG. 1, an embodiment of the present specification further provides an apparatus for training an adaptation quality evaluation model. As shown in FIG. 3, the apparatus includes: an obtaining module 301, configured to obtain an adapted musical work sample set; an audio track separation module 302, configured to separate audio tracks of each adapted musical work sample in the adapted musical work set, and determine instrument information corresponding to each audio track of the adapted musical work sample; an originality analysis module 303, configured to perform musical originality analysis on each audio track of the adapted musical work sample to obtain a musical originality representation value corresponding to each audio track of the adapted musical work sample; a determining module 304, configured to use a combination of the instrument information and the musical originality representation value corresponding to each audio track of the adapted musical work sample as a sample feature of the adapted musical work sample; and a training module 305, configured to perform model training by using each sample feature of the adapted musical work sample as model input, and using an adaptation quality score corresponding to the adapted musical work sample as model output, to obtain an adaptation quality evaluation model.

The instrument information corresponding to each audio track of the adapted musical work sample is a predetermined instrument number or a specified number.

Before model training is performed, the training module 305 determines an amount of pre-specified instrument information in the instrument information corresponding to the adapted musical work sample; and uses the determined amount as a sample feature corresponding to the adapted musical work sample.

Before model training is performed, the training module 305 performs coordination analysis on each audio track of the adapted musical work sample to obtain a coordination representation value corresponding to the adapted musical work sample; and uses the obtained coordination representation value as a sample feature corresponding to the adapted musical work sample.

An adaptation quality score corresponding to each adapted musical work sample in the adapted musical work sample set is manually specified.

Figure 4:
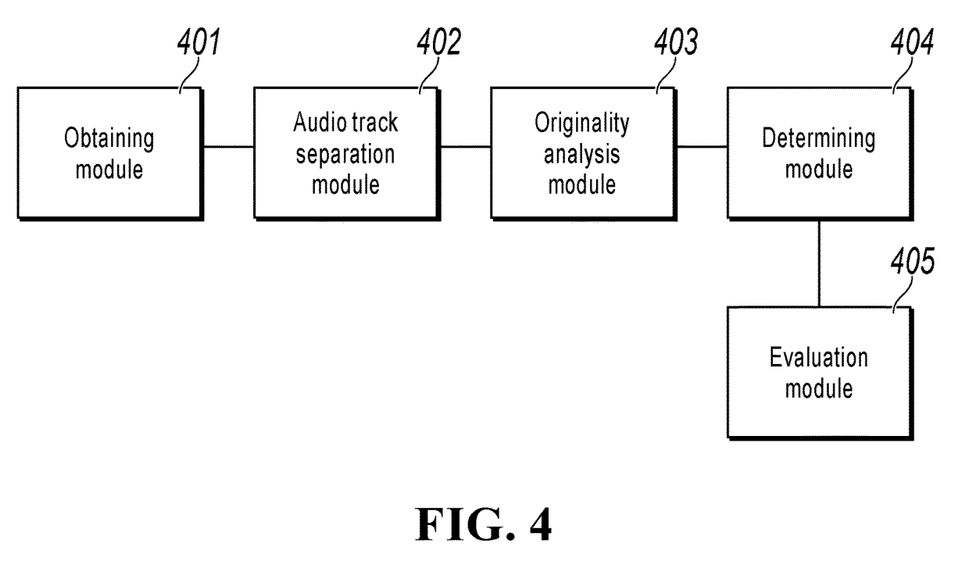
FIG. 4 is a schematic structural diagram illustrating an apparatus for evaluating adaptation quality, according to an embodiment of the present specification.

Based on the method for evaluating adaptation quality shown in FIG. 2, an embodiment of the present specification further provides an apparatus for evaluating adaptation quality. As shown in FIG. 4, the apparatus includes: an obtaining module 401, configured to obtain an adapted musical work; an audio track separation module 402, configured to separate audio tracks of the adapted musical work, and determine instrument information corresponding to each audio track of the adapted musical work; and an originality analysis module 403, configured to perform musical originality analysis on each audio track of the adapted musical work to obtain a musical originality representation value corresponding to each audio track of the adapted musical work; a determining module 404, configured to use a combination of the instrument information and the musical originality representation value corresponding to each audio track of the adapted musical work as a feature of the adapted musical work; and an evaluation module 405, configured to input each feature of the adapted musical work to an adaptation quality evaluation model to obtain an adaptation quality score that corresponds to the adapted musical work and that is output by the adaptation quality evaluation model.

The adaptation quality evaluation model is obtained based on the method for training an adaptation quality evaluation model shown in FIG. 1.

The instrument information corresponding to each audio track of the adapted musical work is a number corresponding to a known musical instrument or a number corresponding to an unknown musical instrument.

Before inputting each feature of the adapted musical work to the adaptation quality evaluation model, the evaluation module 405 determines an amount of pre-specified instrument information in the instrument information corresponding to the adapted musical work; and uses the determined amount as a feature corresponding to the adapted musical work.

Before inputting each sample feature of the adapted musical work to the adaptation quality evaluation model, the evaluation module 405 performs coordination analysis on each audio track of the adapted musical work to obtain a coordination representation value corresponding to the adapted musical work; and uses the obtained coordination representation value as a feature corresponding to the adapted musical work.

An embodiment of the present specification further provides a computer device. The computer device includes at least a memory, a processor, and a computer program that is stored in the memory and that can run on the processor. When executing the program, the processor performs the functions of the methods described in FIG. 1 and FIG. 2.

Figure 5:
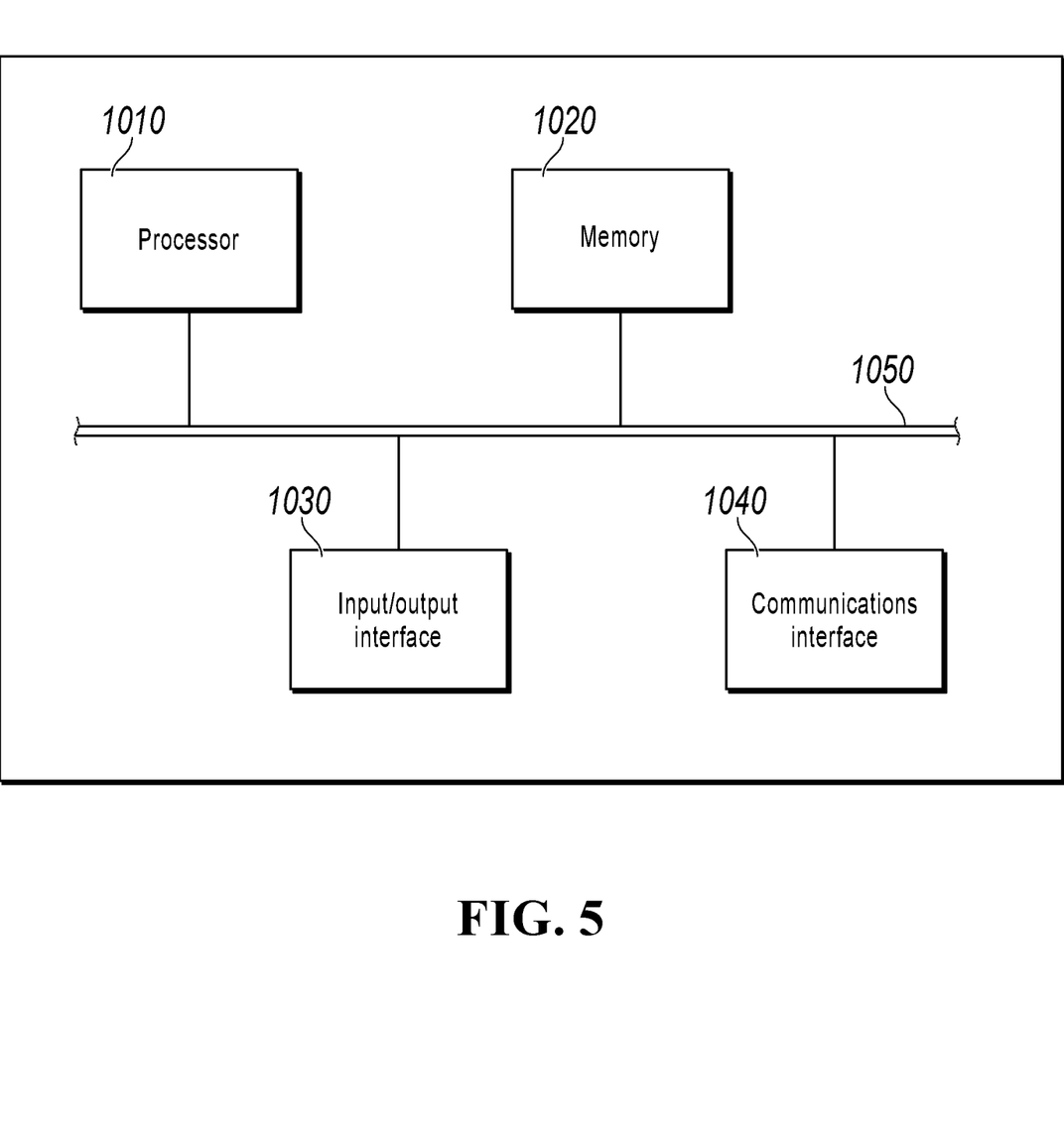
FIG. 5 is a schematic structural diagram illustrating a computer device used to configure the method in an embodiment of the present specification.

FIG. 5 is a more detailed schematic diagram illustrating a hardware structure of a computing device, according to an embodiment of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the embodiments of the present specification.

The memory 1020 can be implemented by using a read-only memory (ROM), a random access memory (RAM), a static storage device, a dynamic storage device, etc. The memory 1020 can store an operating system and another application program. When the technical solutions provided in the embodiments of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input device can include a keyboard, a mouse cursor, a touchscreen, a microphone, various sensors, etc. The output module can include a monitor, a speaker, an oscillator, an indicator, etc.

The communications interface 1040 is configured to be connected to a communications module (not shown in the figure), to implement a communication interaction between the device and another device. The communications module can perform communication in a wired way (for example, USB or a network cable), or can perform communication in a wireless way (for example, a mobile network, Wi-Fi, or Bluetooth).

The bus 1050 includes a channel, used to transmit information between components (for example, the processor 1010, the memory 1020, the input/output interface 1030, and the communications interface 1040) of the device.

It should be noted that although only the processor 1010, the memory 1020, the input/output interface 1030, the communications interface 1040, and the bus 1050 of the device are shown, during specific implementation, the device can further include other components required for implementing normal running. In addition, a person skilled in the art can understand that the device can include only components necessary for implementing the solutions in the embodiments of the present specification, but does not necessarily include all components shown in the figure.

An embodiment of the present specification further provides a computer readable storage medium. The computer readable storage medium stores a computer program, and the program can be executed by a processor to implement functions of the methods shown in FIG. 1 and FIG. 2.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the embodiments that, a person skilled in the art can clearly understand that the embodiments of the present specification can be implemented by using software and a necessary general hardware platform. Based on such an understanding, the technical solutions in the embodiments of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the embodiments of the present specification or in some parts of the embodiments of the present specification.

The system, method, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of these devices.

The embodiments in the present specification are described in a progressive way. For same or similar parts of the embodiments, references can be made to the embodiments. Each embodiment focuses on a difference from other embodiments. Particularly, an apparatus embodiment and a device embodiment are similar to a method embodiment, and therefore are described briefly. For a related part, references can be made to some descriptions in the method embodiment. The previously described method embodiments are merely examples. The modules described as separate parts can or cannot be physically separate. During embodiment of the solutions in the embodiments of the present specification, functions of the modules can be implemented in one or more pieces of software and/or hardware. Some or all of the modules can be selected based on an actual need to implement the solutions of the embodiments. A person of ordinary skill in the art can understand and implement the embodiments of the present specification without creative efforts.

The previous descriptions are merely specific embodiments of the embodiments of the present specification. It should be noted that a person of ordinary skill in the art can further make several improvements or polishing without departing from the principle of the embodiments of the present specification, and the improvements or polishing shall fall within the protection scope of the embodiments of the present specification.

What is claimed is:

1. A computer-implemented method comprising:
   obtaining a plurality of adapted musical work samples;
   separating audio tracks of each of the plurality of adapted musical work samples;
   determining instrument information identifying instruments played in each of the audio tracks;
   performing originality analysis on each of the audio tracks by comparing each of the audio tracks with a melody library to obtain an originality value corresponding to each of the audio tracks, wherein performing the originality analysis on each of the audio tracks comprises:
      comparing a target melody in each of the audio tracks with reference melodies in the melody library;
      determining a key reference melody from the reference melodies in the melody library, wherein the key reference melody is most similar to the target melody in each of the audio tracks in digital analysis;
      obtaining a similarity degree between the target melody in each of the audio tracks and the key reference melody in the melody library; and
      obtaining the originality value corresponding to each of the audio tracks based on the similarity degree;
   for each of the audio tracks, using a combination of the instrument information and the originality value corresponding to a particular audio track of the adapted musical work samples as a sample feature;
   training, by using a machine learning method, a musical work adaptation quality evaluation model by using sample features of corresponding adapted musical work samples as input, and a predetermined evaluation score of a corresponding adapted musical work sample as output;
   outputting, by the musical work adaptation quality evaluation model, an adaptation quality score of each of the plurality of adapted musical work samples; and
   evaluating, by the musical work adaptation quality evaluation model, an adaptation quality for each of the plurality of adapted musical work samples based on the adaptation quality score.

2. The computer-implemented method according to claim 1, wherein the instrument information includes one or more instrument identifier each identifies an instrument played in a corresponding audio track.

3. The computer-implemented method according to claim 1, wherein the sample features further include a number of instruments played in each of the plurality of adapted musical work samples determined from the instrument information.

4. The computer-implemented method according to claim 1, wherein the sample features further include a coordination value corresponding to each of the plurality of adapted musical work samples determined based on performing coordination analysis to the audio tracks.

5. The computer-implemented method according to claim 4, wherein the coordination analysis is performed based on determining how much the audio tracks of each of the plurality of adapted musical work samples are in tune.

6. The computer-implemented method according to claim 1, wherein the predetermined evaluation score is manually assigned.

7. The computer-implemented method according to claim 1, further comprising:
   determining musical features of the plurality of adapted musical work samples; and
   inputting the musical features to the musical work adaptation quality evaluation model to obtain the adaptation quality score.

8. The computer-implemented method according to claim 1, wherein the originality analysis is performed based on comparing an audio track of an adapted musical work sample with reference audio tracks in a music library, determining a reference audio track from the reference audio tracks that is most similar to the audio track as a key reference audio track, and determining a similarity between the audio track and the key reference audio track.

9. A computer-implemented system, comprising one or more computers, and one or more computer memory devices interoperably coupled with the one or more computers and having tangible, non-transitory, machine-readable media storing one or more instructions that, when executed by the one or more computers, perform operations comprising:
   obtaining a plurality of adapted musical work samples;
   separating audio tracks of each of the plurality of adapted musical work samples;
   determining instrument information identifying instruments played in each of the audio tracks;
   performing originality analysis on each of the audio tracks by comparing each of the audio tracks with a melody library to obtain an originality value corresponding to each of the audio tracks, wherein performing the originality analysis on each of the audio tracks comprises:
      comparing a target melody in each of the audio tracks with reference melodies in the melody library;
      determining a key reference melody from the reference melodies in the melody library, wherein the key reference melody is most similar to the target melody in each of the audio tracks in digital analysis;
      obtaining a similarity degree between the target melody in each of the audio tracks and the key reference melody in the melody library; and
      obtaining the originality value corresponding to each of the audio tracks based on the similarity degree;
   for each of the audio tracks, using a combination of the instrument information and the originality value corresponding to a particular audio track of the adapted musical work samples as a sample feature;
   training, by using a machine learning method, a musical work adaptation quality evaluation model by using sample features of corresponding adapted musical work samples as input, and a predetermined evaluation score of a corresponding adapted musical work sample as output;
   outputting, by the musical work adaptation quality evaluation model, an adaptation quality score of each of the plurality of adapted musical work samples; and
   evaluating, by the musical work adaptation quality evaluation model, an adaptation quality for each of the plurality of adapted musical work samples based on the adaptation quality score.

10. The computer-implemented system according to claim 9, wherein the instrument information includes one or more instrument identifier each identifies an instrument played in a corresponding audio track.

11. The computer-implemented system according to claim 9, wherein the sample features further include a number of instruments played in each of the plurality of adapted musical work samples determined from the instrument information.

12. The computer-implemented system according to claim 9, wherein the sample features further include a coordination value corresponding to each of the plurality of adapted musical work samples determined based on performing coordination analysis to the audio tracks.

13. The computer-implemented system according to claim 12, wherein the coordination analysis is performed based on determining how much the audio tracks of each of the plurality of adapted musical work samples are in tune.

14. The computer-implemented system according to claim 9, wherein the predetermined evaluation score is manually assigned.

15. The computer-implemented system according to claim 9, the operations further comprising:
   determining musical features of the plurality of adapted musical work samples; and
   inputting the musical features to the musical work adaptation quality evaluation model to obtain the adaptation quality score.

16. The computer-implemented system according to claim 9, wherein the originality analysis is performed based on comparing an audio track of an adapted musical work sample with reference audio tracks in a music library, determining a reference audio track from the reference audio tracks that is most similar to the audio track as a key reference audio track, and get determining similarity between the audio track and the key reference audio track.

17. A non-transitory, computer-readable medium storing one or more instructions executable by a computer system to perform operations comprising:
   obtaining a plurality of adapted musical work samples;
   separating audio tracks of each of the plurality of adapted musical work samples;
   determining instrument information identifying instruments played in each of the audio tracks;
   performing originality analysis on each of the audio tracks by comparing each of the audio tracks with a melody library to obtain an originality value corresponding to each of the audio tracks, wherein performing the originality analysis on each of the audio tracks comprises:
      comparing a target melody in each of the audio tracks with reference melodies in the melody library;
      determining a key reference melody from the reference melodies in the melody library, wherein the key reference melody is most similar to the target melody in each of the audio tracks in digital analysis;
      obtaining a similarity degree between the target melody in each of the audio tracks and the key reference melody in the melody library; and
      obtaining the originality value corresponding to each of the audio tracks based on the similarity degree;
   for each of the audio tracks, using a combination of the instrument information and the originality value corresponding to a particular audio track of the adapted musical work samples as a sample feature;
   training, by using a machine learning method, a musical work adaptation quality evaluation model by using sample features of corresponding adapted musical work samples as input, and a predetermined evaluation score of a corresponding adapted musical work sample as output;
   outputting, by the musical work adaptation quality evaluation model, an adaptation quality score of each of the plurality of adapted musical work samples; and evaluating, by the musical work adaptation quality evaluation model, an adaptation quality for each of the plurality of adapted musical work samples based on the adaptation quality score.

18. The non-transitory, computer-readable medium according to claim 17, wherein the instrument information includes one or more instrument identifier each identifies an instrument played in a corresponding audio track.

19. The non-transitory, computer-readable medium according to claim 17, wherein the sample features further include a number of instruments played in each of the plurality of adapted musical work samples determined from the instrument information.

20. The non-transitory, computer-readable medium according to claim 17, wherein the sample features further include a coordination value corresponding to each of the plurality of adapted musical work samples determined based on performing coordination analysis to the audio tracks.

21. The non-transitory, computer-readable medium according to claim 20, wherein the coordination analysis is performed based on determining how much the audio tracks of each of the plurality of adapted musical work samples are in tune.

22. The non-transitory, computer-readable medium according to claim 17, wherein the predetermined evaluation score is manually assigned.

23. The non-transitory, computer-readable medium according to claim 17, the operations further comprising:
    determining musical features of the plurality of adapted musical work samples; and
    inputting the musical features to the musical work adaptation quality evaluation model to obtain the adaptation quality score.

24. The non-transitory, computer-readable medium according to claim 17, wherein the originality analysis is performed based on comparing an audio track of an adapted musical work sample with reference audio tracks in a music library, determining a reference audio track from the reference audio tracks that is most similar to the audio track as a key reference audio track, and get determining similarity between the audio track and the key reference audio track.

* * * * *